US006312367B1

(12) United States Patent
Rogge

(10) Patent No.: US 6,312,367 B1
(45) Date of Patent: Nov. 6, 2001

(54) ANILOX ROLLER

(75) Inventor: Guenter Rogge, Lienen (DE)

(73) Assignee: Windmöller & Hölscher, Lengerich (DE)

( * ) Notice: Subject to any disclaimer, the term of this patent is extended or adjusted under 35 U.S.C. 154(b) by 0 days.

(21) Appl. No.: 09/417,489

(22) Filed: Oct. 13, 1999

(30) Foreign Application Priority Data

Oct. 13, 1998 (DE) .............................................. 198 47 108

(51) Int. Cl.[7] ...................................................... B23D 15/00
(52) U.S. Cl. ................................................ 492/35; 492/38
(58) Field of Search ................................ 492/31, 35, 38, 492/43, 44; 101/352.13, 375, 142

(56) References Cited

U.S. PATENT DOCUMENTS 3,818,830 * 6/1974 Schultz .
4,773,143 * 9/1988 Okamura et al. .
4,982,660 * 1/1991 Hamm et al. .
5,191,703 * 3/1993 John .
5,222,434 6/1993 Smith et al. ......................... 101/348
6,006,665 * 12/1999 Stuchlik et al. .

FOREIGN PATENT DOCUMENTS 40 36 661 6/1992 (DE) .
195 16 223 11/1996 (DE) .
2108014 C * 4/1998 (RU) .

* cited by examiner

*Primary Examiner*—I Cuda-Rosenbaum
(74) *Attorney, Agent, or Firm*—Jacobson Holman, PLLC

(57) ABSTRACT

Anilox rollers of doctor units are provided with cells, arranged over the sleeve surface along spiral lines, in order to guarantee that the wear of the doctor blades, employed at said anilox rollers, is as uniform as possible. To prevent the ink from issuing between end-sided seals and the anilox rollers, one end section is provided with narrow sections that exhibit no cells or one end section is provided with end-sided sections, on which the cells are arranged on spiral lines with shallower pitch, or one end section is provided with end sections, on which the cells are arranged on spiral lines with opposite pitch.

14 Claims, 1 Drawing Sheet

ANILOX ROLLER

BACKGROUND OF THE INVENTION

1. Field of the Invention

The invention relates to an anilox roller with cells, arranged over the sleeve surface along one or several spiral lines.

2. Description of the Related Art

Such anilox rollers are used, for example, as inking rollers in printing machines. Usually the anilox roller is a part of a doctor system, as disclosed, for example, in the DE 195 16 223 C2, for a spray inking unit of a rotary printing machine. Said doctor system comprises a doctor blade holder, which is formed by a profile strip with a channel-shaped recess and to which are fastened two doctor blades, which can be employed at the anilox roller and which together with the anilox roller, the channel-shaped recess of the doctor blade holder and seals, provided on the ends of said holder, define an ink chamber. To prevent the ink from issuing between the seals and the anilox roller, the anilox rollers are provided with cell-free sections in the end regions, where the seals rest against said rollers. However, this design has the consequence that the doctor blades, employed at the anilox rollers, are subject to non-uniform wear, because they exhibit more substantial wear in the region of the cells.

SUMMARY OF THE INVENTION

Therefore, the object of the invention is to provide an anilox roller of the type described in the introductory part, which results in the doctor blade, employed at the said anilox roller wearing as uniformly as possible over its length. Furthermore, the goal is also to prevent the ink from issuing between the seals and the anilox roller, a feature that is undesired.

The invention solves this problem according to a first proposal in that at least in one end region of the anilox roller the spiral line is interrupted by a narrow section that exhibits no cells.

Since the entire length of the anilox roller is provided with cells, the length of the doctor blade, employed at said roller, is subject to an essentially uniform wear. The cell-free section can be very narrow and amount to 0.2 mm for example, so that it does not have a negative impact on the essentially uniform wear of the doctor blade over the length of the anilox roller. The narrow, cell-free section has the effect that the transport of ink is interrupted and the ink does not issue between the seals and the anilox roller.

The problem is solved according to a second proposal in that at least one section of the anilox roller is provided with cells, which are arranged on spiral lines with shallower pitch. This design, too, has the effect that the doctor blade, employed at the anilox roller, is worn essentially uniformly over the length of the anilox roller. The end section, where the cells are arranged on spiral lines with shallower pitch, prevents the ink from issuing in an undesired manner between the seal and the anilox roller.

The problem is solved by a third proposal in that an end section of the sleeve surface of the anilox roller is provided with spiral lines with opposite pitch, on which the cells are arranged. This design, too, has the effect that the doctor blade, employed at the anilox roller, will wear uniformly, thus preventing the ink from issuing in an undesired manner between the seal and the anilox roller.

The cells are designed expediently polygonally and preferably hexagonally; the cells, which follow in succession in the axial direction, are configured in such a manner that they engage so as to mesh. Hence, the cells, arranged on the spiral lines with shallow pitch, are arranged so as to follow closely in succession and to be separated only by narrow webs.

BRIEF DESCRIPTION OF THE DRAWINGS

The embodiments of the invention are explained in detail below with reference to the drawings.

DETAILED DESCRIPTION OF THE PREFERRED EMBODIMENTS

Figure 1:
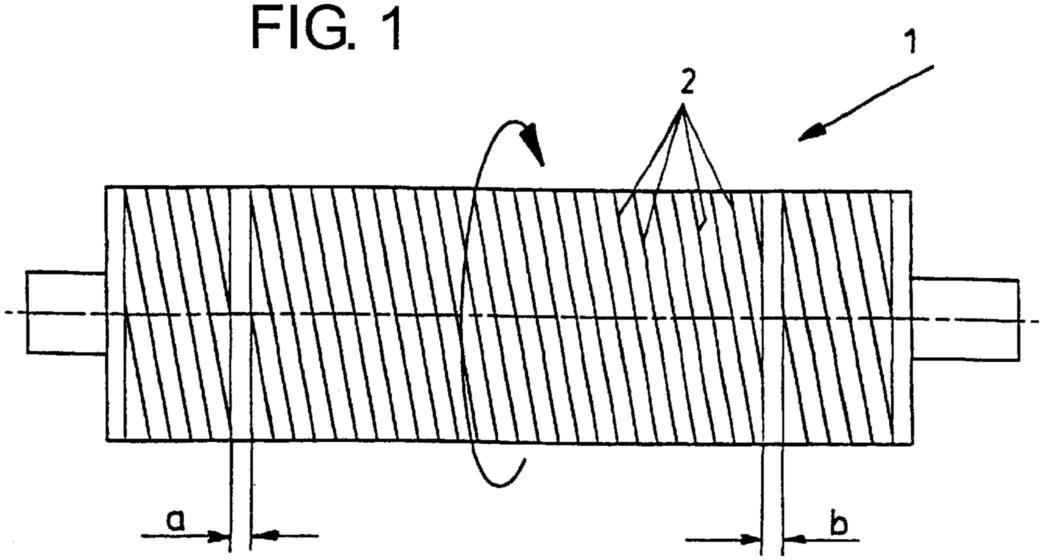
FIG. 1 is a top view of an anilox roller, where in the end sections the screening is interrupted by narrow, cell-free sections.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The anilox rollers, shown in the drawings, are pivot-mounted in ink unit blocks by means of their shaft ends in the manner, described, for example, in the DE 195 16 223 C2. Doctor systems are employed at the anilox rollers in a manner that is also described, for example, in the DE 195 16 223 C2. Said doctor systems comprise doctor blade holders, the doctor blades, fastened to said holders, side seals, press-on units and comprise lines to supply and drain ink.

The sleeve surface of the anilox roller 1, shown in FIG. 1, is provided with cells, which follow closely in succession and which are arranged on a spiral line 2 with shallow pitch, over its length. The cells are embedded into the steel sleeve of the anilox roller using a laser beam. To affix the cells the roller can be rotated continuously or intermittently, whereby the sleeve surface is driven with a laser beam, which is moved at a slow speed in the axial direction of the anilox roller 1. The diameter of the cells, burned thus into the sleeve of the anilox roller, can be in the $\mu$ range.

The end region of the anilox roller 1 exhibits sections a and b, which extend over the roller's circumference and which exhibit no cells. The axial length of these sections a and b can be very short and amount, for example, to about 0.2 mm.

Figure 2:
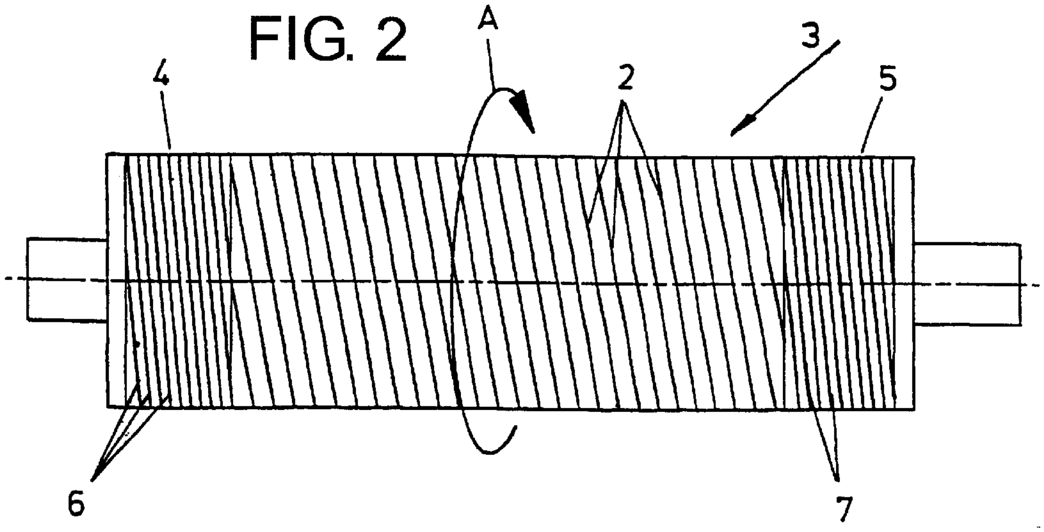
FIG. 2 is a top view of an anilox roller, where in the end sections the cells are arranged on spiral lines with shallower pitch.

FIG. 2 depicts an anilox roller 3, whose center section is provided with cells in the same manner as the anilox roller, described with reference to FIG. 1. The anilox roller 3 is provided with end sections 4, 5, where the cells are arranged on spiral lines 6, 7 with shallower pitch. These sections have the impact that, as the anilox roller rotates in the direction of the arrow A, no ink issues between the end sections and the seals, resting against the same.

Figure 3:
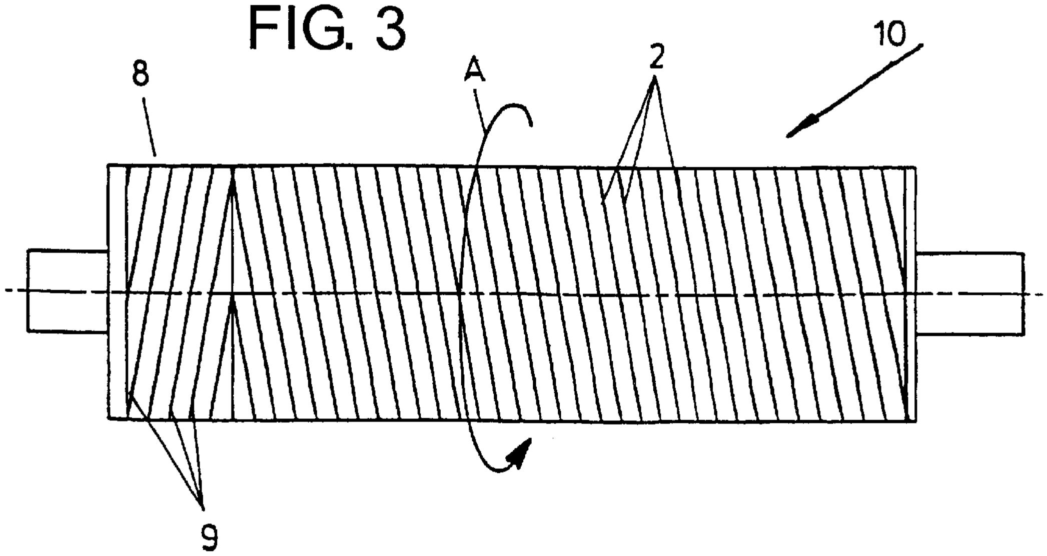
FIG. 3 is a top view of an anilox roller, where one end section is provided with cells that are arranged on spiral lines with opposing pitch.

In the embodiment, according to FIG. 3, the cells are affixed in the end region 8 on spiral lines 9 with opposite pitch. The length of the end region 8 of the anilox roller sleeve is equivalent to the width of the seal and can range, for example, from 2 cm to 3 cm in the axial direction. When the anilox roller rotates in the direction of the arrow A, the end region 8 prevents the ink from issuing between the seal and the anilox roller 10.

The cells, arranged in close succession on the spiral lines, are designed expediently polygonally and preferably hexagonally. They are arranged in such a manner expediently in the axial direction that they mesh together. This means that sections of the following cells engage with sections of the preceding cells so that they overlap when seen in the direction of the spiral line.

In the end region b the cells are affixed on the spiral line 4 with opposite pitch. The length of the section b of the anilox roller sleeve is equivalent to the width of the seal and can be, for example, 3 cm in the axial direction.

If the anilox roller is driven in the direction of arrow A, the cells, arranged on the spiral lines 4, in the end section b convey the ink in the region of the end seal again in the direction of the center of the anilox roller.

The invention being thus described, it will be obvious that the same may be varied in many ways. Such variations are not to be regarded as a departure from the spirit and scope of the invention, and all such modifications as would be recognized by one skilled in the art are intended to be included within the scope of the following claims.

What is claimed is:

1. Anilox roller having a sleeve surface with cells arranged over the sleeve surface along several spiral lines, said spiral lines in at least one end region of the anilox roller being interrupted by a narrow section that exhibits no cells, said narrow section without cells for interrupting ink flow toward an outer edge of said end region.

2. Anilox roller having a sleeve surface with cells arranged over the sleeve surface along at least a first spiral line, at least one end section of the anilox roller provided with cells which are arranged on at least a second spiral line with shallower pitch than a pitch of said first spiral line, said first spiral line abutting said second spiral line around a full circumference of said roller along a line transverse to an axis of rotation of said roller, said second spiral line with shallower pitch interrupting ink flow toward an outer edge of said end section.

3. Anilox roller having a sleeve surface with cells arranged over the sleeve surface along a first spiral line, wherein an end section of the sleeve surface is provided with a second spiral line with opposite pitch relative to said first spiral line, on which the cells are arranged, said first spiral line abutting said second spiral line around a full circumference of said roller along a line transverse to an axis of rotation of said roller, said second spiral line interrupting ink flow toward an outer edge of said end section.

4. Anilox roller, as claimed in claim 1, wherein the cells are designed polygonally and the cells, which follow in succession in the axial direction, are configured in such a manner that they engage so as to mesh.

5. The anilox roller as set forth in claim 1, wherein the narrow section extends over a full circumference of said roller transverse to an axis of rotation of said roller.

6. An anilox roller comprising a sleeve surface with a center region and two end regions, said center region of the sleeve surface having cells arranged along a first spiral line, and at least one of said two end regions of said sleeve surface having cells arranged on a second spiral line, said second spiral line having a different pitch than said first spiral line for preventing ink from flowing in an axial direction toward an outer edge of said at least one end region, a pitch of said first spiral line being uniform across a full length of said center region.

7. The anilox roller as set forth in claim 6, wherein a pitch of said second spiral line is shallower than a pitch of said first spiral line.

8. The anilox roller as set forth in claim 6, wherein a pitch of said second spiral line is opposite a pitch of said first spiral line.

9. The anilox roller as set forth in claim 6, wherein said at least one end region ranges in width from 2 cm to 3 cm in the axial direction.

10. The anilox roller as set forth in claim 9, further comprising a seal resting against said at least one end region and having a width substantially equal to the width of said at least one end region, said seal and said at least one end region preventing ink from issuing therebetween.

11. The anilox roller as set forth in claim 5, wherein said narrow section has a uniform width around a full circumference of said roller.

12. The anilox roller as set forth in claim 1, wherein said spiral lines are being interrupted near each end of said roller by a respective narrow section that exhibits no cells such that said roller is divided into a center region and two end regions, each of said narrow sections extending over a circumference of said roller transverse to an azis of rotation of said roller, a pitch of said spiral lines being uniform across said center region.

13. The anilox roller as set forth in claim 12, wherein each narrow section has a uniform width around a full circumference of said roller.

14. The anilox roller as set forth in claim 6, wherein said second spiral line directly abuts said first spiral line around a full circumference of said roller.

* * * * *